United States Patent Office 3,142,555
Patented July 28, 1964

3,142,555
METHOD FOR COMBATING WEEDS
Gene E. Schroll, Baton Rouge, La., assignor to Ethyl Corporation, New York, N.Y., a corporation of Virginia
No Drawing. Original application May 13, 1960, Ser. No. 28,847, now Patent No. 3,054,740, dated Sept. 18, 1962. Divided and this application Nov. 16, 1961, Ser. No. 157,867
7 Claims. (Cl. 71—2.3)

This invention relates to and has as its principal objects the provision of novel methods for the preparation of organomanganese compounds, the provision of the compounds themselves and the use thereof as herbicides in combating weeds and other undesirable plants.

This application is a division of application Serial No. 28,847, filed May 13, 1960, now Patent No. 3,054,740.

In accordance with the present invention it has been found that when a cyclopentadienyl manganese tricarbonyl compound—preferably one wherein the cyclopentadienyl radical contains from 5 to about 24 carbon atoms—is caused to react in the presence of actinic light with a phosphine, arsine, stibine, phosphite, arsenite or antimonite reactant, one or two of the carbonyl groups of the cyclopentadienyl manganese tricarbonyl can be replaced by the same number of molecules of the reactant. The Group V–A reactants used in this process are preferably triorgano compounds of phosphorus, arsenic or antimony having the formula $$R'_3M$$

wherein R' is an alkyl, alkoxy, cycloalkyl, cycloalkoxy, aryl, aryloxy, aralkyl, aralkoxy, alkaryl or alkaryloxy radical, and wherein the several R' groups can be the same or different; and M is phosphorus, arsenic or antimony—i.e., a Group V–A element having an atomic number of 15 through 51 (Periodic Chart of the Elements, Fisher Scientific Company, New York, 1955). Generally speaking, each of the R' radicals contains up to about 18 carbon atoms.

An important feature of this reaction is its photochemical nature. It is induced by radiation in approximately the 280 to 380 micron region, and thus effective use can be made of commercially available sunlamps as sources of radiation. When the process of this invention is conducted on a laboratory scale, quartz or other material transparent to this wave length range should be used for the reaction vessels. Larger scale operations preferably involve suspension of the actinic light source in or over the reaction vessels so that the radiation impinges directly upon the reaction mixture. Under the foregoing conditions, a satisfactory reaction rate is obtained at a temperature of 20° C. or below, whereas in the absence of ultraviolet radiation the temperature required for reaction is so high that extensive decomposition occurs. In short, the reaction is totally impractical in the absence of actinic light radiation.

The products formed by the process of this invention are represented by the general formula $$RMn(CO)_{3-n}(R'_3M)_n$$

wherein R is a simple or substituted cyclopentadienyl radical containing from 5 to about 24 carbon atoms, M is P, As or Sb, R' is a hydrocarbon radical such as alkyl, aryl, cycloalkyl, aralkyl or alkaryl, or an oxyhydrocarbon radical corresponding to one of the foregoing hydrocarbon radicals (e.g., alkoxy, etc.), and n is one or two.

In general, the extent to which the carbonyl groups of the cyclopentadienyl manganese tricarbonyl reactant are replaced by the phosphine or other ligand is determined largely by the ratio of the reactants employed. Excess of the manganese reactant tends to favor the replacement of one carbonyl group only, whereas excess of the ligand favors replacement of two carbonyl groups. However, the reaction product is frequently a mixture of mono- and di-substitution products, which can readily be separated by distillation or other appropriate means such as solvent extraction procedures, fractional crystallizations, and the like.

A particularly preferred embodiment of the present invention is the use in the above reaction of the triorganophosphine or triorganophosphite reactants and the consequent production of the corresponding cyclopentadienyl manganese dicarbonyl triorganophosphines or triorganophosphites or the corresponding cyclopentadienyl manganese carbonyl bis-triorganophosphines or bis-triorganophosphites. These reactants are readily prepared and require no elaborate precautions in handling and the products resulting from their use are particularly thermally stable compounds, soluble without decomposition in organic solvents.

Another highly preferred embodiment of the present invention is the reaction of cyclopentadienyl manganese tricarbonyl or a lower alkyl cyclopentadienyl manganese tricarbonyl with a tri-lower alkyl phosphine or phosphite or with a triphenylphosphine or -phosphite containing up to four carbon atoms as alkyl substituents on the ring, the reactants being exposed to ultraviolet light to produce a compound of the general formula $$RMn(CO)_{3-n}L_n$$

wherein R is cyclopentadienyl or lower alkyl cyclopentadienyl, the ligand L is selected from the phosphines and the phosphites described in this paragraph, and n is one or two. (In this connection the term "lower alkyl" is used in its accepted sense, that is, an alkyl group having from 1 to about 6 carbon atoms.) When the particular reactants mentioned above are used, the reaction proceeds very smoothly and rapidly giving an excellent yield of especially valuable products.

The reactions of this invention can be carried out in the absence of any solvent. However, for a number of reasons it is preferred to use a solvent. The higher homologs of both reactants, namely, of the simple or substituted cyclopentadienyl manganese tricarbonyl and of the phosphorus, arsensic or antimony ligand, tend to be crystalline solids at ordinary temperature. As a result, efficient contact between these reactants is assured by the use of a solvent. Whereas some of the higher molecular weight Group V–A reactants melt at moderately elevated temperatures, their melting points in some cases approximate the temperatures at which the compounds decompose and thus the use of a solvent makes it unnecessary to use such elevated temperatures. Furthermore, the use of a solvent permits regulation of the reaction temperature by operation at reflux, and the particular reaction temperature desired can be achieved by choice of an appropriate solvent.

Any organic solvents which are inert to the reactants and products can be used and, if they have boiling points within the range of stability of the reactants and products, the reflux technique may be employed to maintain constancy of temperature. These solvents should be substantially anhydrous in order to avoid excessive hydrolysis of the Group V–A reactant.

The hydrocarbons and ethers are particularly suitable solvents for the reaction of this invention. The aromatic hydrocarbons are preferred inasmuch as they are somewhat better solvents for the reactants than are the aliphatic compounds. Examples of suitable solvents include benzene, toluene, the xylenes, 2,2,5-trimethylhexane, di-n-butylether, anisole, tetrahydrofuran, and the like.

The reactions of this invention can be carried out at any temperature within the stability range of the reactants and products which is high enough to provide a satisfactory reaction rate. Specifically, temperatures ranging from about 20° to about 150° C. have been found to be satisfactory.

The compounds of this invention are, in general, solids which are stable at ordinary temperatures and which can readily be prepared and stored without special precautions for future use. They are soluble in organic solvents such as aliphatic and aromatic hydrocarbons, esters and ethers.

An outstanding characteristic of the compounds of this invention is their extreme value as weed killers, especially when applied as post-emergence sprays to certain vegetable and cereal crops. Their usefulness in this capacity is markedly enhanced by the high phytotoxic selectivity which they exhibit as between desirable and undesirable plant species. This selectivity is an essential quality of highly efficient weed killers which must of course be far more destructive to the weeds than to the host crops. From the standpoints of phytotoxic potency against weeds and selectivity of phytotoxic action, the phosphorus-containing compounds of this invention are preferred for this use. Of these phosphorus-containing compounds, the cyclopentadienyl maganese carbonyl triarylphosphines and the cyclopentadienyl manganese carbonyl triarylphosphites are most especially preferred from a cost-effectiveness standpoint.

The invention will be more fully understood by reference to the following set of illustrative examples, in which all parts and percentages are by weight.

EXAMPLE I

Two parts of cyclopentadienyl manganese tricarbonyl and 3 parts of triphenyl phosphine were mixed with 40 parts of benzene and the mixture was subjected to ultraviolet radiation from a General Electric RS-type "sunlamp" for a period of 3 hours in order to effect ligand replacement. The mixture was then filtered, the filtrate was concentrated by evaporation under moderately reduced pressure and the residue was crystallized from a benzene-hexane mixture. The yellow crystalline compound, cyclopentadienyl manganese dicarbonyl triphenyl phosphine, was dried in vacuo; it melted at 215 to 216° C. (Found: C 68.06, H 4.67, Mn 11.78 percent. Required: C 68.40, H 4.61, Mn 12.50 percent.) The infrared spectrum shows two absorption peaks (C—O stretching vibration) at 5.17 and 5.36 microns. The yield (percent conversion of manganese) was 50 percent.

EXAMPLE II

Thirty-three parts of methylcyclopentadienyl manganese tricarbonyl and 39 parts of triphenyl phosphine were mixed with 150 parts of benzene, the mixture being exposed to ultraviolet light for a period of 45 hours. The isolation of the product was carried out as in Example I. The product, methylcyclopentadienyl manganese dicarbonyl triphenyl phosphine, melted at 118 to 119° C. (Found: C 69.16, H 4.99, Mn 11.78 percent. Required: C 69.00, H 4.91, Mn 12.13 percent.) The infrared spectrum shows absorption peaks at 5.19 and 5.36 microns. The manganese conversion was 60 percent.

EXAMPLE III

Two parts of cyclopentadienyl manganese tricarbonyl and 3 parts of triphenyl phosphite were mixed with 25 parts of 2,2,5-trimethylhexane and the mixture was exposed to sunlamp radiation for a period of 1 hour. The product was recovered as in Example I. The crystalline product, cyclopentadienyl manganese dicarbonyl triphenyl phosphite, melted at 123° C. (Found: C 61.65, H 4.41, Mn 11.10 percent. Required: C 61.70, H 4.14, Mn 11.30 percent.) The compound shows two absorption peaks in the infrared spectrum at 5.10 and 5.27 microns. The manganese conversion was 25 percent.

EXAMPLE IV

Seventy parts of methylcyclopentadienyl manganese tricarbonyl and 99 parts of triphenyl phosphite were mixed with 150 parts of benzene and the mixture was subjected to sunlamp radiation for a period of 27 hours. The product was isolated as in Example I. The crystalline reaction product, methylcyclopentadienyl manganese dicarbonyl triphenyl phosphite, melted at 64 to 65° C. (Found: C 62.23, H 4.55, Mn 10.69 percent. Required: C 62.40, H 4.44, Mn 10.97 percent). The compound shows absorption peaks at 5.11 and 5.29 microns. The manganese conversion was 52 percent.

EXAMPLE V

The procedure of Example IV was repeated except that the quantity of triphenyl phosphite was doubled. The crystalline product, methylcyclopentadienyl manganese carbonyl bis-triphenyl phosphite, melted at 139 to 140° C. (Found: C 65.72, H 4.92, Mn 6.22 percent. Required: C 66.00, H 4.77, Mn 7.02 percent). The compound showed a single infrared absorption peak at 5.30 microns. The manganese conversion was 17 percent.

EXAMPLE VI

Eight parts of cyclopentadienyl manganese tricarbonyl and 25 parts of triphenyl phosphite were mixed with 50 parts of benzene and the mixture was subjected to sunlamp radiation for a period of 22 hours. The product was recovered as described in Example I. The product, cyclopentadienyl manganese carbonyl bis-triphenyl phosphite, melted at 120 to 121° C. Found: C 65.16, H 4.56, Mn 7.14 percent. Required: C 65.60, H 4.60, Mn 7.15 percent.) The crystalline compound shows a single infrared absorption peak at 5.30 microns. The manganese conversion was 68 percent.

EXAMPLE VII

Seventy parts of methylcyclopentadienyl manganese tricarbonyl and 40 parts of trimethyl phosphite were mixed with 100 parts of benzene and the mixture was subjected to sunlamp radiation for a period of 22 hours. The reaction mixture was fractionated at a pressure of 1.0 mm. in a 1-foot Vigreux column. From 0 to 121° C. (largely at 62° C.) a 38 percent recovery of unreacted methylcyclopentadienyl manganese tricarbonyl obtained. From 121 to 124° C., methylcyclopentadienyl manganese dicarbonyl trimethyl phosphite distilled over, the yield being 39 percent, based on the manganese. (Found: C 41.53, H 5.22, Mn 17.26 percent. Required: C 42.10, H 5.14, Mn 17.48 percent.) This compound showed absorption peaks at 5.15 and 5.33 microns. The heating was continued until a temperature of 154° was attained, a very small quantity of a viscous distillate being obtained. The residue, corresponding to 23 percent of the original manganese, was methylcyclopentadienyl manganese carbonyl bis-trimethyl phosphite.

EXAMPLE VIII

Sixty-one parts of cyclopentadienyl manganese tricarbonyl and 61 parts of tributyl phosphine were mixed with 75 parts of benzene and the mixture was subjected to sunlamp radiation for a period of 43 hours. The mixture was then filtered and the filtrate was concentrated by evaporation under moderately reduced pressure. In this instance the crude product, cyclopentadienyl manganese dicarbonyl tri-n-butyl phosphine, was used without further purification, after removal of the solvent and remaining reactant species. (Found: C 61.96, H 9.48, Mn 12.33 percent. Required: C 60.30, H 8.53, Mn 14.50 percent.) This product showed infrared peaks at 5.19 and 5.37 microns and a shoulder at 5.45 microns, the latter indicating the presence of some monocarbonyl products. The manganese conversion was 74 percent.

EXAMPLE IX

When 22 parts of methylcyclopentadienyl manganese tricarbonyl are reacted with 16 parts of triethylarsine in the absence of any solvent at a temperature of 80° C. for a period of 7 hours while the mixture is irradiated with ultraviolet light, methylcyclopentadienyl manganese dicarbonyl triethylarsine is obtained.

EXAMPLE X

Cyclopentadienyl manganese tricarbonyl and tribenzylarsine, in the proportion of 20 parts of the former to 35 parts of the latter, are reacted at 150° C. in the absence of a solvent for a period of one hour with exposure to ultraviolet light. The product is cyclopentadienyl manganese dicarbonyl tribenzylarsine.

EXAMPLE XI

Twenty parts of cyclopentadienyl manganese tricarbonyl are reacted with 16 parts of tri-n-propylphosphine in the presence of 100 parts of benzene at 20° C. The mixture is irradiated with ultraviolet light for a period of 150 hours. Cyclopentadienyl manganese dicarbonyl tri-n-propylphosphine is obtained.

EXAMPLE XII

Dibutylcyclopentadienyl manganese tricarbonyl (32 parts) and trimesitylstibine (48 parts) are dissolved in 400 parts of 2,2,5-trimethylhexane. The mixture is heated to reflux and irradiated for 6 hours with ultraviolet light. The product is dibutylcyclopentadienyl manganese dicarbonyl trimesitylstibine.

EXAMPLE XIII

Thirty-two parts of octylcyclopentadienyl manganese tricarbonyl and 53 parts of tris (4-biphenylyl)arsine dissolved in 420 parts of benzene are exposed to ultraviolet light for 27 hours at 80° C. The product is octylcyclopentadienyl manganese dicarbonyl tris(4-biphenylyl)-arsine.

EXAMPLE XIV

When 46 parts of octadecylcylopentadienyl manganese tricarbonyl and 21 parts of trimethylantimonite are dissolved in 250 parts of toluene and the mixture is exposed for 16 hours at 110° C. to radiation from an ultraviolet lamp, octadecylcyclopentadienyl manganese dicarbonyl trimethylantimonite is obtained.

EXAMPLE XV

A mixture of 47 parts of methyl octadecylcyclopentadienyl manganese tricarbonyl and 25 parts of tri-n-butylarsine is dissolved in 350 parts of benzene and heated under reflux for 22 hours with exposure to ultraviolet light. The product is methyl octadecylcyclopentadienyl manganese dicarbonyl tri-n-butylarsine.

EXAMPLE XVI

To 37 parts of dodecylcyclopentadienyl manganese tricarbonyl, 38 parts of tri-n-hexylstibine are added and the mixture is dissolved in 380 parts of benzene. The solution is heated to reflux and exposed to ultraviolet radiation for 16 hours. Dodecylcyclopentadienyl manganese dicarbonyl tri-n-hexylstibine is obtained.

EXAMPLE XVII

Twenty-three parts of dimethylcyclopentadienyl manganese tricarbonyl and 68 parts of tri-dodecylphosphite, dissolved in 380 parts of 2,2,4-trimethylpentane, are heated to 100° C. with exposure to ultraviolet light for a period of 22 hours. The product is dimethylcyclopentadienyl manganese dicarbonyl tri-dodecylphosphite.

EXAMPLE XVIII

Butylcyclopentadienyl manganese tricarbonyl, tricyclohexylantimonite and benzene are combined in the ratio 26:42:270. The mixture is irradiated at reflux temperature with ultraviolet light for a period of 8 hours. The product is butylcyclopentadienyl manganese dicarbonyl tricyclohexylantimonite.

EXAMPLE XIX

Cyclopentadienyl manganese tricarbonyl (20 parts) and tribenzylstibine (79 parts) are dissolved in 200 parts of toluene. The mixture is exposed to ultraviolet light at reflux temperature for 27 hours. Cyclopentadienyl manganese carbonyl bis-tribenzylstibine is obtained.

EXAMPLE XX

A mixture of 22 parts of methylcyclopentadienyl manganese tricarbonyl, 78 parts of trimesitylphosphine and 200 parts of toluene is exposed at 110° C. to ultraviolet light for a period of 28 hours. The product is methylcyclopentadienyl manganese carbonyl bis-trimesitylphosphine.

EXAMPLE XXI

When 27 parts of methyl butylcyclopentadienyl manganese tricarbonyl and 116 parts of tris(4-biphenylyl)stibine are mixed with 700 parts of benzene and the mixture is exposed at reflux temperature to ultraviolet light for a period of 27 hours, methyl butylcyclopentadienyl manganese carbonyl bis[tris(4-biphenylyl)-stibine] is obtained.

EXAMPLE XXII

To 20 parts of cyclopentadienyl manganese tricarbonyl, 15 parts of trimethylphosphine is added and the mixture is dissolved in 250 parts of benzene. The resulting mixture, heated to 80° C., is exposed to ultraviolet radiation for a period of 6 hours. The product is cyclopentadienyl manganese carbonyl bis-trimethylphosphine.

EXAMPLE XXIII

Thirty-two parts of dibutylcyclopentadienyl manganese tricarbonyl, dissolved in 150 parts of 2,2,4-trimethylpentane, is mixed with 34 parts of trimethylarsenite, dissolved in the same quantity of trimethylpentane, and exposed at reflux temperature to ultraviolet radiation for a period of 22 hours. The product is dibutylcyclopentadienyl manganese carbonyl bis-trimethylarsenite.

EXAMPLE XXIV

Thirty-two parts of octylcyclopentadienyl manganese tricarbonyl is added to 67 parts of tri-n-hexylphosphite and the mixture is treated with 500 parts of benzene. Exposure of the mixture at 80° C. and for a period of 8 hours to ultraviolet light results in the formation of octylcyclopentadienyl manganese carbonyl bis-tri-n-hexylphosphite.

EXAMPLE XXV

Benzene solutions of 46 parts of octadecylcyclopentadienyl manganese tricarbonyl and 126 parts of tri-dodecylarsenite are mixed and exposed at reflux temperature for 16 hours to ultraviolet light. The product is octadecylcyclopentadienyl manganese carbonyl bis-tridodecylarsenite.

EXAMPLE XXVI

Twenty-two parts of methylcyclopentadienyl manganese tricarbonyl are added to a mixture of 74 parts of tricyclohexylstibine and 250 parts of toluene. The mixture is heated to 90° C. and exposed to ultraviolet radiation for 18 hours. Methylcyclopentadienyl manganese carbonyl bis-tricyclohexylstibine is obtained.

EXAMPLE XXVII

A mixture of 25 parts of indenyl manganese tricarbonyl, 21 parts of triethylarsenite and 200 parts of 2,2,5-trimethylhexane is heated to reflux while exposed to ultraviolet light for a period of 7 hours. Indenyl manganese dicarbonyl triethylarsenite is obtained.

EXAMPLE XXVIII

A mixture of 31 parts of fluorenyl manganese tricarbonyl, 66 parts of tri-n-hexylarsine and 200 parts of benzene is heated to 60° C. and exposed to ultraviolet light for a period of 18 hours. The product is fluorenyl manganese carbonyl bis-tri-n-hexylarsine.

EXAMPLE XXIX

Acetylcyclopentadienyl manganese tricarbonyl (25 parts) and tridodecylstibine (68 parts) are reacted in toluene (250 parts) for 23 hours at 80° C. in the presence of ultraviolet radiation. The product is acetylcyclopentadienyl manganese dicarbonyl tridodecylstibine.

EXAMPLE XXX

Twenty-two parts of methylcyclopentadienyl manganese tricarbonyl and 39 parts of tris(propylphenyl)phosphine are mixed with 250 parts of benzene and the mixture is irradiated with ultraviolet light for 23 hours at reflux temperature. The product is methylcyclopentadienyl manganese dicarbonyl tris(propylphenyl)phosphine.

EXAMPLE XXXI

Twenty-three parts of dimethylcyclopentadienyl manganese tricarbonyl are added to a mixture of 79 parts of tris(ethylphenyl)phosphite with 410 parts of benzene and the mixture is exposed to ultraviolet light for 26 hours at 80° C. The product is dimethylcyclopentadienyl manganese carbonyl bis[tris(ethylphenyl)phosphite].

EXAMPLE XXXII

Forty-eight parts of methyl stearoyl cyclopentadienyl manganese tricarbonyl is dissolved in 370 parts of benzene and the solution is mixed with 44 parts of tri-p-tolyl antimonite. The mixture is heated to reflux while exposed to ultraviolet light for a period of 30 hours. The product is methyl stearoyl cyclopentadienyl manganese dicarbonyl tri-p-tolyl antimonite.

EXAMPLE XXXIII

When 27 parts of ethylpropylcyclopentadienyl manganese tricarbonyl and 40 parts of trianisylphosphite are mixed with 500 parts of benzene and the mixture is exposed to ultraviolet light at 80° C. for a period of 18 hours, ethylpropylcyclopentadienyl manganese dicarbonyl trianisylphosphite is obtained.

As brought out above, these compounds are extremely potent phytotoxic agents, which are featured by high selectivity as between weeds or other undesired plant species and cereals or other valuable plant crops. For example, when applied at the rate of 4 pounds per acre, methylcyclopentadienyl manganese dicarbonyl triphenylphosphite was found to be severely phytotoxic to such weeds as foxtail and crabgrass, whereas it was found to be nontoxic to wheat and cotton under the same conditions. Thus, in order to take advantage of these extremely valuable herbicidal properties, one applies the compounds of this invention (preferably in the form of post-emergence sprays) to the locus of the undesired plants, such as weeds and the like, these undesired plants being preferentially attacked or killed, whereas the cereal or other valuable crops are for all practical purposes unaffected. As a matter of fact, the compounds of this invention are generally more effective against weeds than maleic hydrazide and far less toxic to wheat and corn than the widely used 2,4-dichlorophenoxyacetic acid.

Varying amounts of the herbicides of this invention can be used, depending upon such factors as the density of the undesired foliage, the type of plant species to be eradicated, and the nature of the prevailing climate. Generally speaking, these agents are applied to average plant species of normal density at the rate of about 0.5 to about 10 pounds per acre.

The compounds herein described, when used as agricultural agents, can be applied as dusts, or in the form of mixtures with carriers such as bentonite or talc or with other agricultural chemicals or related substances such as insecticides, fertilizers, etc., or they can be employed in the form of sprays by dissolving them in suitable carriers (such as dichlorodifluoromethane) to form aerosols.

To demonstrate the outstanding phytotoxic potency and the very valuable selective herbicidal activity which the compounds of this invention exhibit, a series of standard herbicidal experiments was carried out using a broad spectrum of plant species, desirable and undesirable. The desirable species included wheat, corn, beans and cotton, and the undesirable species, pigweed, mustard, foxtail and crabgrass. To each species were applied various compounds of this invention, the herbicidal activity being measured by periodic inspection of the plants to determine the degree of attack, extent of kill, etc. For this purpose the following standard scale was used.

*Phytotoxicity Rating*

0=None
1–3=Slight
4–6=Moderate
7–9=Severe
10=All killed

Included in these experiments for comparative purposes were the standard commercial weed killers, maleic hydrazide and 2,4-dichlorophenoxy acetic acid. In addition, cyclopentadienyl manganese tricarbonyl was subjected to these tests. Each of the compounds was applied as a post-emergence spray at the rate of 4 pounds per acre. The data are presented quantitatively in the following table.

PHYTOTOXICITY RATINGS TO WEEDS AND TO PLANT SPECIES (CHEMICALS APPLIED AS POST-EMERGENCE SPRAYS

| Chemical | Weeds | | | | Plant species | | | |
|---|---|---|---|---|---|---|---|---|
| | Pigweed | Mustard | Foxtail | Crabgrass | Wheat | Corn | Beans | Cotton |
| Control | 0 | 0 | 0 | 0 | 0 | 0 | 0 | 0 |
| Methylcyclopentadienyl manganese dicarbonyl triphenyl phosphite | 6 | 5 | 7 | 7 | 0 | 2 | 2 | 0 |
| Methylcyclopentadienyl manganese carbonyl bis(triphenyl phosphite) | 4 | 3 | 1 | 3 | 0 | 0 | 0 | 0 |
| Methylcyclopentadienyl manganese dicarbonyl triphenyl phosphine | 7 | 7 | 3 | 5 | 0 | 0 | 0 | 0 |
| Methylcyclopentadienyl manganese carbonyl bis(triphenyl phosphine) | 10 | 8 | 1 | 2 | 1 | 4 | 1 | 2 |
| Cyclopentadienyl manganese tricarbonyl | 0 | 0 | 0 |  | 0 | 0 | 0 | 2 |
| Maleic hydrazide | 0 | 0 | 4 | 4 | 0 | 1 | 0 | 0 |
| 2,4-Dichlorophenoxyacetic acid | 10 | 10 | 0 | 6 | 0 | 2 | 8 | 10 |

In manufacturing the compounds of this invention, the ratio of the reactants can be varied within wide limits, namely, from a 100 percent or greater excess (over the amount stoichiometrically required for the particular product compound desired) of the carbonyl compound to a 100 percent or greater excess of the ligand. The use of excess carbonyl tends to form dicarbonyl compounds, whereas excess ligand favors the formation of monocarbonyl derivatives.

The reaction period can range from less than one hour to greater than one day, depending upon the reaction temperature and the nature of the reactants. Other things being equal, the introduction of alkyl substituents into, or the lengthening of alkyl chains in, the reactants tends to reduce the reaction rate and increase the needed reaction time. Generally speaking, the higher the reaction temperature, the shorter the reaction period. Furthermore, the use of solvents, especially aromatic hydrocarbons, tends to increase the reaction rate and thereby reduce the period.

A wide variety of temperatures, from 0° to 225° C. or above, can be employed. The generally useful temperatures range from about 20° to the decomposition temperature of the Group V-A reactant or of the reaction product. Accordingly, temperatures up to about 200° C. are satisfactory, but those up to about 150° C. are preferred.

The wave length of the light used for the irradiation of the reaction mixture is not critical but should be less than about 380 microns. Any wave length or mixture of wave lengths in the range from about 280 microns or less to about 380 microns is effective in bringing about the reaction of the invention. Although the General Electric RS-type sunlamp is a convenient source of such illumination, use may be made of any source providing sufficient flux in the desired ultraviolet wave length range.

The reactants from which the compositions of this invention are prepared comprise, as shown above, a cyclopentadienyl manganese tricarbonyl compound, unsubstituted or bearing one or more substituents on the cyclopentadiene ring, and a hydrocarbon derivative or oxyhydrocarbon derivative of phosphorus, arsenic or antimony.

The manganese reactants are exemplified by cyclopentadienyl manganese tricarbonyl, methylcyclopentadienyl manganese tricarbonyl, dibutylcyclopentadienyl manganese tricarbonyl, octylcyclopentadienyl manganese tricarbonyl, dodecylcyclopentadienyl manganese tricarbonyl, octadecylcyclopentadienyl manganese tricarbonyl, methyl octadecylcyclopentadienyl manganese tricarbonyl, indenyl manganese tricarbonyl, fluorenyl manganese tricarbonyl and acetyl cyclopentadienyl manganese tricarbonyl. These manganese compounds are prepared from the corresponding cyclopentadiene hydrocarbon derivatives, but the presence on the cyclopentadiene ring of such substituents as halogen, acyl groups, and the like, is entirely satisfactory. Methods for the preparation of these manganese compounds are described in U.S. Patents Nos. 2,818,416 and 2,818,417.

The phosphorus reactants include triphenylphosphine, triphenylphosphite, trimethylphosphine, tri-n-hexylphosphite and phenyldiethylphosphite. Methods for the preparation of organic phosphines and phosphites are described by G. M. Kosolapoff in "Organo-Phosphorus Compounds," Wiley, New York, 1950, pages 10–22 and 180–192.

Examples of the arsenic reactants are: triethylarsine, tribenzylarsine, tri-biphenylylarsine, tributylarsine and triethylarsenite. Synthetic methods for compounds of these types will be found in G. W. Raiziss and J. L. Gavron, "Organic Arsenical Compounds," Reinhold, New York, 1923, pages 36–68, 103–234 and 489.

Among the antimony reactants are: trimethylantimony, trimethylantimonite, trihexylantimony, tricyclohexylantimonite and tridodecylantimonite. The preparation of such compounds is described by W. G. Christiansen in "Organic Derivatives of Antimony," Reinhold, New York, 1925, pages 23–5, 31–4 and 93–4.

The solvents employed may include aromatic hydrocarbons such as benzene, toluene, the xylenes and the like, aliphatic hydrocarbons such as the trimethylhexanes, aliphatic or aromatic ethers, such as dibutyl ether, tetrahydrofuran, anisole, dioxane, dioxolane, dimethyl ether of diethylene glycol, diethyl ether of diethylene glycol, and the like, or mixtures of any of the foregoing. The preferred solvents are hydrocarbons, especially aromatic, because the reactants are relatively more soluble in aromatic than in aliphatic hydrocarbons. Among the aromatic hydrocarbons, benzene is preferred because the reflux temperature of benzene is an espeecially satisfactory temperature for carrying out the reaction. The solvents should be substantially anhydrous because of the sensitivity of the esters, particularly those of phosphorus, to hydrolysis.

The reaction of this invention may be carried out under any atmosphere inert to both reactants and products, but dry nitrogen is preferred. Other suitable protective atmospheres include hydrogen, carbon monoxide, helium, neon, argon, krypton and xenon.

The products of the reaction of this invention are soluble in and can be purified by recrystallization from a variety of nonhydroxylic organic solvents. Specifically, simple aromatic solvents such as benzene, simple aliphatic solvents such as hexane, ether-hydrocarbon mixtures such as diethyl ether-hexane mixtures and ester-hydrocarbon mixtures such as ethyl acetate-hexane mixtures are found to be satisfactory.

As shown above, the products of this invention are especially effective weed killers. Moreover, they have been found to exhibit pronounced antiknock effects when added to fuels. For example, two grams of manganese per gallon of an unleaded gasoline as methyl cyclopentadienyl manganese dicarbonyl trimethyl phosphite has been found to increase the ASTM Research octane rating of the fuel by almost 7 octane numbers and methyl cyclopentadienyl manganese dicarbonyl triphenyl phosphine, when added, in an amount equivalent to 0.05 gram of manganese per gallon, to a fuel containing 3 milliliters of tetraethyllead per gallon, was found to increase the octane rating of the leaded fuel by more than one unit.

I claim:
1. The method for combating weeds which comprises treating the locus of the weeds with a herbicidal quantity of a compound represented by the general formula

$$RMn(CO)_{3-n}(R'_3M)_n$$

wherein R is a cyclopentadienyl radical containing from about 5 to about 24 carbon atoms, M is an element of Group V-A of the Periodic System having an atomic number from 15 to 51, inclusive, R' is a radical selected from the group consisting of alkyl, alkoxy, cycloalkyl, cycloalkoxy, aryl, aryloxy, aralkyl, aralkoxy, alkaryl and alkaryloxy radicals, and $n$ is an integer from 1 to 2, inclusive.

2. The method of claim 1, wherein said compound is a cyclopentadienyl manganese carbonyl triarylphosphine.

3. The method of claim 1, wherein said compound is a cyclopentadienyl manganese carbonyl triarylphosphite.

4. The method of claim 1, wherein said compound is methylcyclopentadienyl manganese dicarbonyl triphenyl phosphite.

5. The method of claim 1, wherein said compound is methylcyclopentadienyl manganese carbonyl bis(triphenyl phosphite).

6. The method of claim 1, wherein said compound is methylcyclopentadienyl manganese dicarbonyl triphenyl phosphine.

7. The method of claim 1, wherein said compound is methylcyclopentadienyl manganese carbonyl bis(triphenyl phosphine).

No references cited.